(12) United States Patent
Naito et al.

(10) Patent No.: US 10,769,398 B2
(45) Date of Patent: Sep. 8, 2020

(54) READING DEVICE

(71) Applicant: TOSHIBA TEC KABUSHIKI KAISHA, Tokyo (JP)

(72) Inventors: Hidehiro Naito, Mishima Shizuoka (JP); Hitoshi Iizaka, Fuji Shizuoka (JP); Shinsuke Yajima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 16/291,474

(22) Filed: Mar. 4, 2019

(65) Prior Publication Data

US 2019/0272403 A1     Sep. 5, 2019

(30) Foreign Application Priority Data

Mar. 5, 2018  (JP) .................... 2018-038216

(51) Int. Cl.
 *G06K 7/14* (2006.01)
 *G07G 1/00* (2006.01)
 *G07G 1/12* (2006.01)
(52) U.S. Cl.
 CPC .......... *G06K 7/1413* (2013.01); *G07G 1/0018* (2013.01); *G07G 1/12* (2013.01)
(58) Field of Classification Search
 CPC ............................ G06Q 20/20; G07G 1/0036
 USPC .................. 235/383, 375, 487; 705/5, 13
 See application file for complete search history.

(56) References Cited

U.S. PATENT DOCUMENTS

| 5,177,345 A | 1/1993 | Baitz |
| 9,155,406 B1 | 10/2015 | Whiteside et al. |
| 10,588,432 B2* | 3/2020 | Nishio ................... G07D 11/22 |
| 2007/0016481 A1* | 1/2007 | Morrison ................ A47F 9/046 |
| | | 705/24 |
| 2014/0029069 A1 | 1/2014 | Mikami |

FOREIGN PATENT DOCUMENTS

| EP | 3061366 A1 | 8/2016 |
| EP | 3239889 A1 | 11/2017 |
| JP | 2016064171 A | 4/2016 |

OTHER PUBLICATIONS

Extended European Search Report dated May 17, 2019, mailed in counterpart European Application No. 19160507.0, 7 pages.

* cited by examiner

*Primary Examiner* — Edwyn Labaze
(74) *Attorney, Agent, or Firm* — Kim & Stewart LLP

(57) ABSTRACT

In an embodiment, a reading device comprises a housing having a height. A first reading window is on a first surface side of the housing at a first height position. A first reading unit is inside the housing and configured to direct light out the first reading window for imaging an item. A second reading window is on a second surface side of the housing at a second height position that is less than the first height position in height. A second reading unit is inside the housing and configured to direct light out the second reading window for imaging an item.

20 Claims, 6 Drawing Sheets

FIG. 7

COMMODITY REGISTRATION

| SCANNER | COMMODITY | NUMBER | AMOUNT |
|---|---|---|---|
| FIRST SCANNER | COMMODITY A | 1 | 1,050 |
| FIRST SCANNER | COMMODITY B | 1 | 600 |
| FIRST SCANNER | COMMODITY C | 1 | 150 |
| SECOND SCANNER | COMMODITY D | 1 | 120 |
|  |  |  |  |

FIRST SCANNER  COMMODITY E                    1 PIECE  135 YEN 2,055

READING DEVICE

CROSS-REFERENCE TO RELATED APPLICATION

This application is based upon and claims the benefit of priority from. Japanese Patent Application No. 2018-038216, filed in Mar. 5, 2018, the entire contents of which are incorporated herein by reference.

FIELD

Embodiments described herein relate generally to a reading device.

BACKGROUND

In the related art, in a retail store such as a supermarket, a reading device which reads information from a commodity to be sold is known. The related art discloses an imaging unit oriented obliquely upward towards a customer side of a vertical scanner type of reading device. This imaging unit is used to read various kinds of information by obtaining an image of a screen of a portable terminal held by the customer.

However, the imaging unit described in the related art is placed on an upper portion of the housing of the vertical scanner type reading device. Therefore, a customer having a short stature, such as a child, may find it hard to hold the portable terminal in a position permitting the imaging unit to obtain an image of the screen of the portable terminal. Furthermore, customers of short stature have had problems with even finding the imaging unit in the first place.

DESCRIPTION OF THE DRAWINGS

FIG. 7 is an explanatory diagram of a commodity registration screen.

DETAILED DESCRIPTION

According to one embodiment, a reading device comprises a housing having a height in a first direction. A first reading window is on a first surface side of the housing at a first height position along the first direction. A first reading unit is inside the housing and configured to direct light out the first reading window for imaging an item. A second reading window is on a second surface side of the housing at a second height position along the first direction that is less than the first height position in height. A second reading unit is inside the housing and configured to direct light out the second reading window for imaging an item.

Hereinafter, example embodiments of a reading device will be described with reference to the accompanying drawings. These examples do not limit the scope of the present disclosure. The reading device of an embodiment applied to a registration device that registers commodities in sales transactions at retail shops such as supermarkets.

Figure 1:
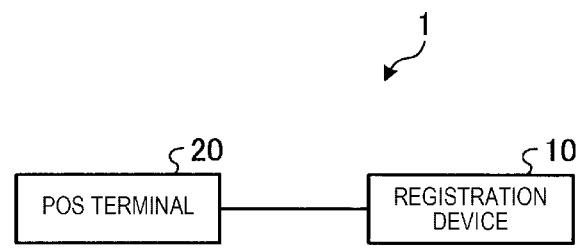
FIG. 1 is an explanatory diagram illustrating an example of a point-of-sale (POS) system according to an embodiment.

FIG. 1 is an explanatory diagram illustrating an example of a point of sale (POS) system 1 according to an embodiment. A POS system 1 includes a registration device 10 and a POS terminal 20. The registration device 10 and the POS terminal 20 are communicably connected via a network or the like.

The registration device 10 is, for example, a vertical scanner that executes registration processing for registering a commodity (item) to be sold in a sales transaction. The registration device 10 reads a commodity code that can identify the commodity. The commodity code is represented on the commodity by a code symbol such as a bar code, for example. When the registering is completed, the registration device 10 transmits commodity information such as the read commodity code to the POS terminal 20.

The POS terminal 20 is a sales data processing device that executes settlement accounting for the commodities registered by the registration device 10. The POS terminal 20 executes the settlement accounting based on the commodity information received from the registration device 10. In addition, the POS terminal 20 prints a receipt including the sales transaction details for each transaction.

Figure 2:
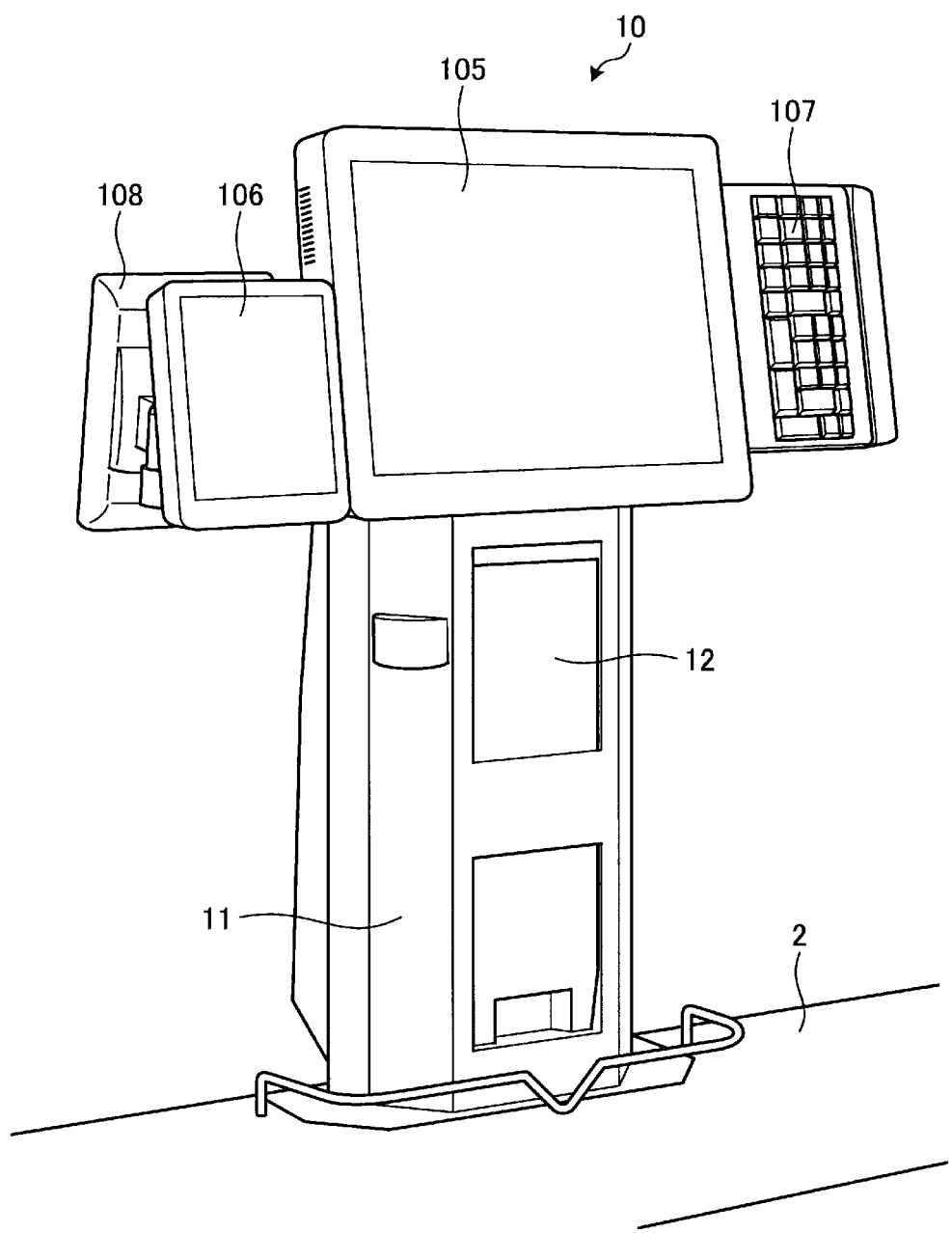
FIG. 2 is a perspective view illustrating an external appearance of a registration device as viewed from a clerk side.
Figure 3:
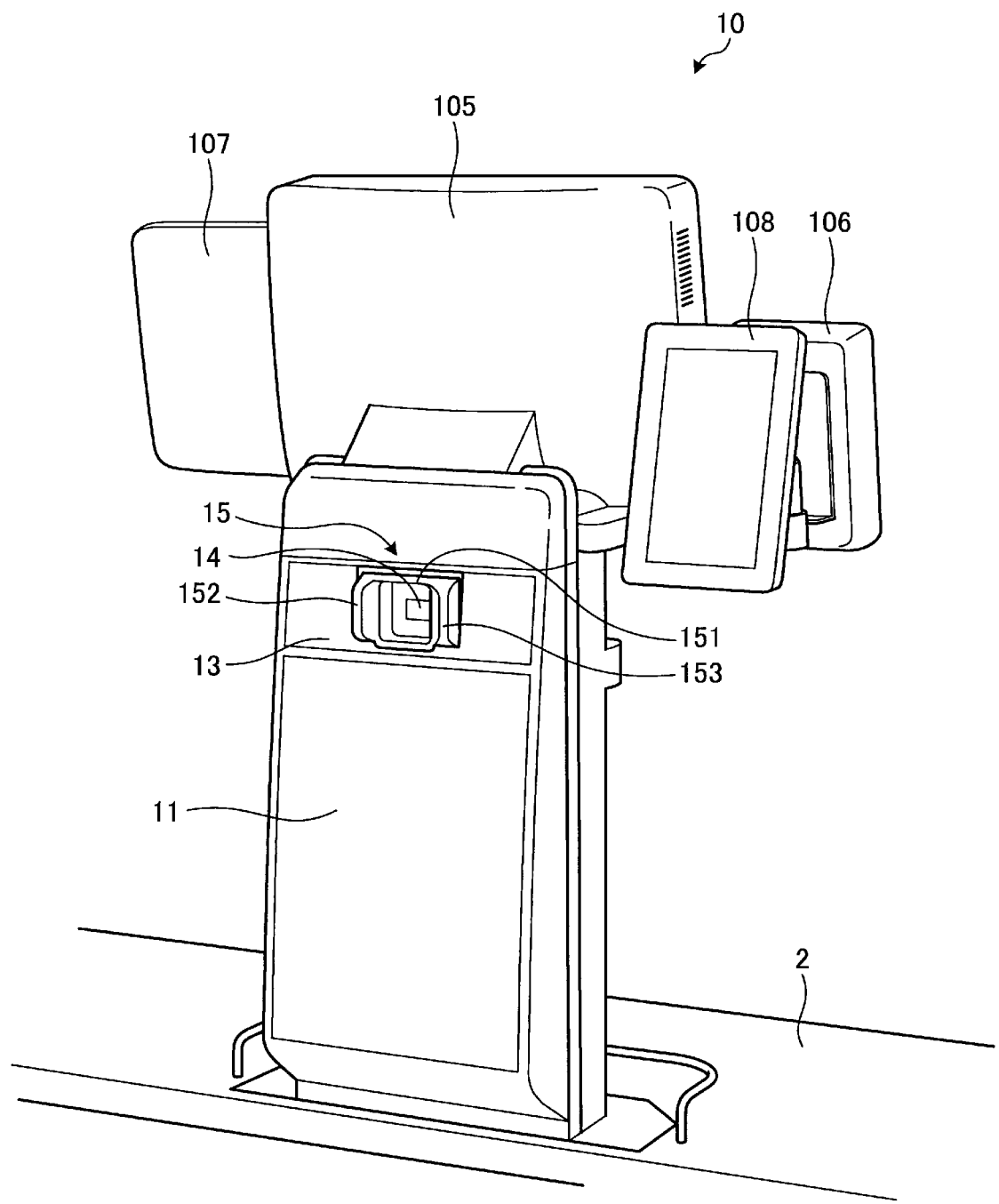
FIG. 3 is a perspective view illustrating an external appearance of a registration device as viewed from a customer side.

Next, an external appearance of the registration device 10 will be described. FIG. 2 is a perspective view illustrating an example of external appearance of the registration device 10 as viewed from a clerk side. FIG. 3 is a perspective view illustrating an example of external appearance of the registration device 10 as viewed from a customer side.

The registration device 10 is placed on a counter table 2. The registration device 10 has a substantially rectangular parallelepiped housing 11 that is long in the vertical direction. The housing 11 includes a first reading window 12 on the clerk side. That is, the registration device 10 has a first reading window 12 on one surface of the housing 11. The first reading window 12 is formed of a transparent plate or the like. The registration device 10 has a first scanner 104 (refer to FIG. 5) inside the first reading window 12. The first scanner 104 is directed from an inside of the housing 11 to an outside of the first reading window 12.

The first scanner 104 is an example of a first reading unit. The first scanner 104 reads information indicated by a code symbol such as a bar code or a two-dimensional code. For example, the first scanner 104 includes image sensors such as a charge coupled device (CCD) and a complementary metal-oxide semiconductor (CMOS), and a lighting unit. By imaging the code symbol, the first scanner 104 reads information such as the commodity code indicated by the code symbol. The first scanner 104 may read the commodity code or the like indicated by the code symbol by laser light. In addition, the first scanner 104 may recognize the article by object recognition for reading the feature amount of the article and extract the commodity code.

The registration device 10 includes a first display unit 105, a second display unit 106, and an operation unit 107, which are directed to the clerk side on the upper portion of the housing 11. The first display unit 105 is, for example, a liquid crystal display device in which a touch panel is stacked. The first display unit 105 displays various kinds of information to an operator such as a clerk. The second display unit 106 is, for example, a liquid crystal display device in which a touch panel is stacked. The second display unit 106 displays supplementary various kinds of information such as a state of the POS terminal 20, for example, to the operator such as the clerk. The operation unit 107 is an input device such as a keyboard that accepts various operations, for example.

The registration device 10 includes a third display unit 108 on a right side of the housing 11 as viewed from a customer side and on a rear side of the second display unit 106. The third display unit 108 is, for example, a liquid crystal display device in which a touch panel is stacked. The third display unit 108 displays, for example, various kinds of information to the customer.

In addition, the housing 11 includes a mounting plate 13 on a side surface on the customer side, which forms a portion of a side surface of the housing 11. The mounting plate 13 is an example of a mounting portion. The mounting plate 13 is disposed on the side surface of the housing 11 opposite to the side surface of the housing 11 provided with the first reading window 12, and at the substantially same position in the vertical direction in which the first reading window 12 is provided. The mounting plate 13 includes a second reading window 14 formed of a plate that can transmit light. That is, the second reading window 14 is disposed on the side surface of the housing 11 opposed to the side surface of the housing 11 provided with the first reading window 12, and at the substantially same position in the vertical direction in which the first reading window 12 is provided. On the mounting plate 13, a second scanner 109 (refer to FIG. 5) is attached inside the second reading window 14. The second scanner 109 is directed from the inside of the mounting plate 13, that is, the housing 11 to the outside of the second reading window 14.

The second scanner 109 is an example of a second reading unit. The second scanner 109 reads information indicated by a code symbol such as a bar code or a two-dimensional code. For example, the second scanner 109 includes image sensors such as a CCD and a CMOS, and a lighting unit. By imaging the code symbol, the second scanner 109 reads information indicated by the code symbol. In addition, the second scanner 109 may read the information indicated by the code symbol by laser light.

In addition, it is assumed that the second scanner 109 does not limit an object to be read. That is, the second scanner 109 may read the code symbol displayed on the screen of a mobile phone or a smartphone, or may read the code symbol printed on a coupon ticket or the like, or may read the code symbol attached to the commodity.

In addition, the mounting plate 13 includes a reading table 15 around the second reading window 14 provided in the housing 11. The reading table 15 is a base on which an article to be read by the second scanner 109 is pressed. The reading table 15 includes a wall portion 151 that surrounds a periphery of the second reading window 14. The wall portion 151 protrudes from the housing 11 in a substantially horizontal direction.

In addition, the reading table 15 includes a first protruding portion 152 and a second protruding portion 153 protruding in a substantially horizontal direction on the left and right of the wall portion 151. The first protruding portion 152 and the second protruding portion 153 are formed in mountain shapes that are thinner toward a tip end. In addition, the first protruding portion 152 and the second protruding portion 153 may be provided with a cushioning material at the tip end. The cushioning material inhibits the article from being scratched if an article such as a commodity or a portable terminal is pressed.

In general, screen sizes and resolutions are different between different smartphones and mobile phones. Therefore, when the second scanner 109 images the screen of one of these mobile terminals, the preferred imaging distance from the mobile terminal to the second scanner 109 may be different depending on the smartphone or mobile phone.

Here, the distance between the first protruding portion 152 and the second protruding portion 153 is substantially the same as the width of a mobile phone. Therefore, when imaging the screen of the mobile phone, the customer can insert the mobile phone between the first protruding portion 152 and the second protruding portion 153. On the other hand, when imaging the screen of the smartphone, the customer will press the smartphone against the tip ends of the first protruding portion 152 and the second protruding portion 153. Therefore, the reading table 15 can cause the second scanner 109 to image the screens at a preferred imaging distance corresponding to the type of the mobile terminal being imaged.

In addition, similarly, when reading a code symbol printed on a coupon ticket or a code symbol attached to the commodity, the customer presents the code symbol at a position corresponding to the resolution of the printed code symbol. As a result, the second scanner 109 can image the code symbol or the like at the preferred imaging distance.

Furthermore, the tip ends of the first protruding portion 152 and the second protruding portion 153 are formed substantially vertically. In addition, the tip end of the wall portion 151 is formed substantially vertically. Therefore, the customer cannot stably place an article such as a mobile phone on the reading table 15. Therefore, the design of the reading table 15 can prevent the article from being left behind. In addition, the second reading window 14 is formed substantially vertically. Therefore, dust is prevented from accumulating on the surface of the second reading window 14. Furthermore, when compared with the case in which the second reading window 14 is formed obliquely upward, the glare sensed by the customer will be reduced.

Figure 4:
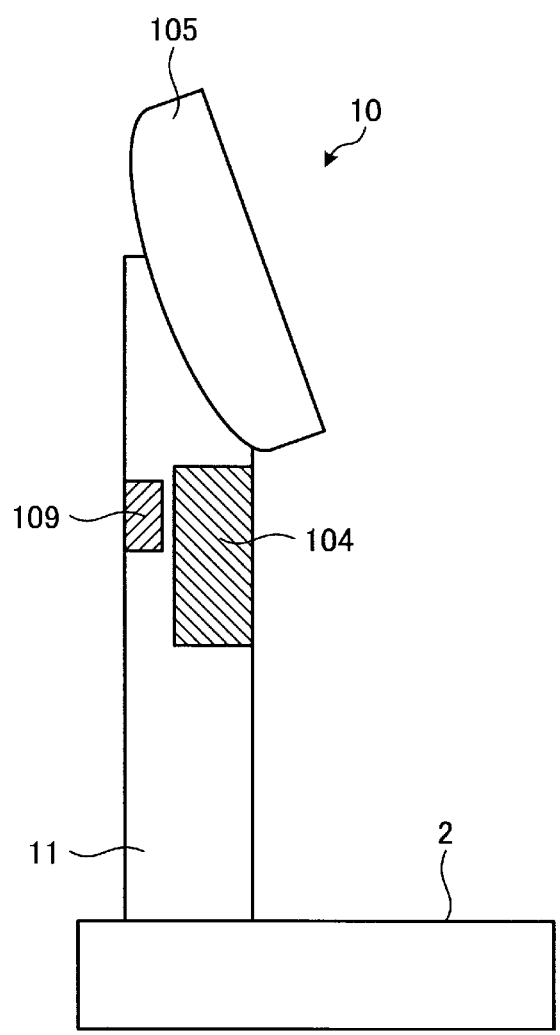
FIG. 4 is an explanatory diagram of an internal configuration of a registration device.

Next, the arrangement of the first scanner 104 and the second scanner 109 of the registration device 10 will be described. FIG. 4 is an explanatory diagram for explaining an example of the registration device 10.

The second scanner 109 is disposed on a rear side of the first scanner 104. That is, the second scanner 109 is provided at substantially the same height as the height at which the first scanner 104 is provided. Here, the first scanner 104 is disposed at a height at which the clerk can comfortably hold the commodity. Therefore, the second scanner 109 is likewise provided at a height at which the first scanner 104 is provided, so that the customer can comfortably hold an article to be imaged by the second scanner 109.

Figure 5:
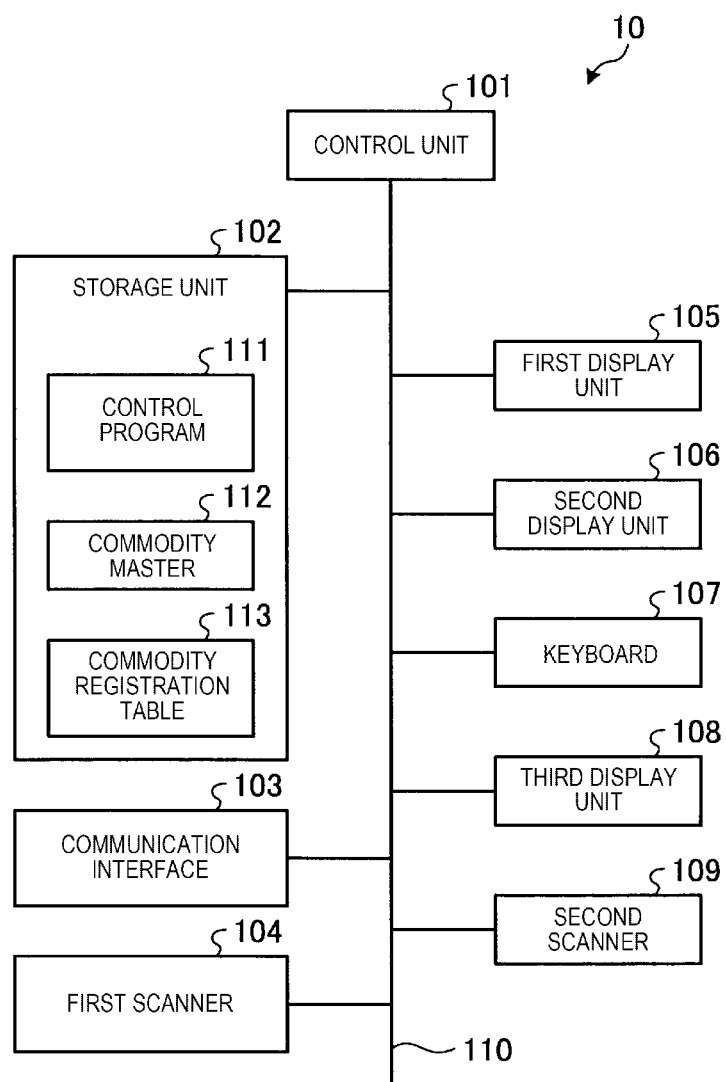
FIG. 5 is a block diagram illustrating a hardware configuration of a registration device.

FIG. 5 is a block diagram schematically illustrating an example of the hardware configuration of the registration device 10. The registration device 10 includes a control unit 101, a storage unit 102, a communication interface 103, the first scanner 104, the first display unit 105, the second display unit 106, the operation unit 107, the third display unit 108, and the second scanner 109. These units are mutually connected via a system bus 110 such as a data bus and an address bus.

The control unit 101 is a controller, such as a computer, that controls the overall operation of the registration device 10 and realizes various functions of the registration device 10. The control unit 101 includes a central processing unit (CPU), a read only memory (ROM), and a random access memory (RAM). The CPU controls the overall operation of the registration device 10. The ROM is a storage medium that stores various programs and data. The RAM is a storage medium that temporarily stores various programs and various data. The CPU executes a program stored in the ROM, the storage unit 102 or the like using the RAM as a work area.

The storage unit 102 is a storage device such as a hard disk drive (HDD) or a solid-state drive (SSD). Here, the storage unit 102 stores a control program 111, a commodity master 112, and a commodity registration table 113.

The control program 111 implementing the described functions of the registration device 10 according to the present embodiment.

The commodity master 112 is a database that stores various kinds of information for the commodity. For example, the commodity master 112 stores a commodity code, a commodity name, and a price in association with each other. The commodity code is identification information that can be used to identify the commodity. The commodity name is information corresponding to the name of the commodity. The price is information corresponding to the price of the commodity.

The commodity registration table 113 is a table in which various information of the commodity or commodities registered in a sales transaction or the like. For example, the commodity registration table 113 stores the commodity code, the scanner code, the commodity name, the price, and the item number for the commodity in the sales transaction in association with each other. The commodity code specifies a commodity to be sold. The scanner code is identification information capable of identifying the first scanner 104 and the second scanner 109 as the source of the commodity code in the sales transaction. That is, the scanner code is information indicating which one of the first scanner 104 and the second scanner 109 has been used to read the commodity code in the sales transaction being registered. The commodity name is a name of the associated commodity. The price is the sales price of the associated commodity. The item number is the number of individual instances of the commodity (having the same commodity code) in the sales transaction.

The communication interface 103 performs communication with a device connected via a network. For example, the communication interface 103 communicates with the POS terminal 20 connected via the network.

In addition, the registration device 10 is not limited to the specific hardware illustrated in FIG. 5, and may include, for example, a card reader for reading a credit card or the like, and/or a pin pad for entering a personal identification number, or the like.

Figure 6:
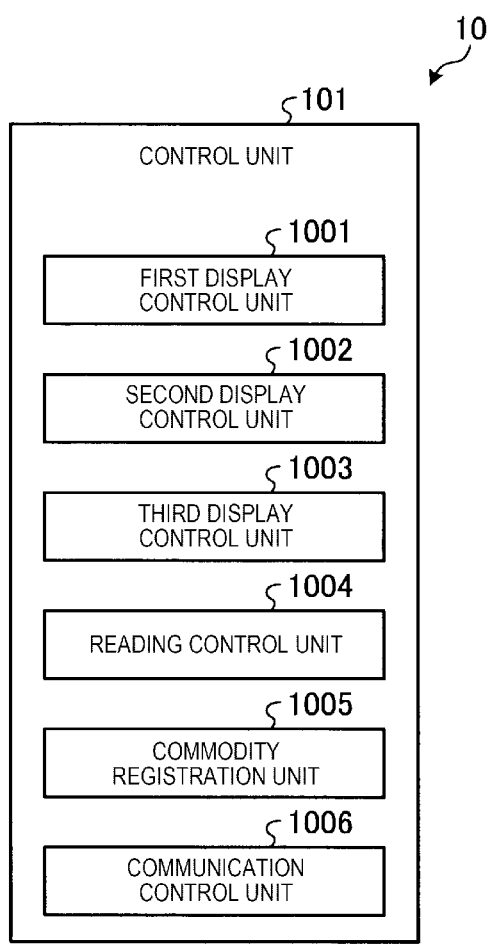
FIG. 6 is a block diagram illustrating a schematic functional configuration of a registration device.

Here, FIG. 6 is a block diagram illustrating an example of a schematic functional configuration of the registration device 10. The control unit 101 of the registration device 10 loads the control program 111 from the storage unit 102 on the RAM and operates in accordance with the control program 111 to thereby generate each functional unit illustrated in FIG. 6. Specifically, the control unit 101 of the registration device 10 schematically includes or provides a first display control unit 1001, a second display control unit 1002, a third display control unit 1003, a reading control unit 1004, a commodity registration unit 1005, and a communication control unit 1006 as functional units implemented according to the control program 111.

The first display control unit 1001 controls the first display unit 105 to display various screens.

The second display control unit 1002 controls the second display unit 106 to display various screens.

The third display control unit 1003 controls the third display unit 108 to display various screens.

The reading control unit 1004 controls the first scanner 104 and the second scanner 109 to read various kinds of information. The reading control unit 1004 decodes information such as code symbols read by the first scanner 104 and extracts code information therefrom. In addition, the reading control unit 1004 decodes information such as code symbols read by the second scanner 109 and extracts code information therefrom.

The commodity registration unit 1005 is an example of a register unit and an output unit. The commodity registration unit 1005 controls the commodity registration processing for registering each commodity (item) being sold in a sales transaction. The commodity registration unit 1005 registers various information for each commodity identified by a reading of a commodity code into the commodity registration table 113 according to the code information extracted by the reading control unit 1004. More specifically, the commodity registration unit 1005 registers/writes the commodity code extracted by the reading control unit 1004 in the commodity registration table 113. In addition, the commodity registration unit 1005 also registers, in the commodity registration table 113, the scanner code for the first scanner 104 or the second scanner 109 according to which reads the commodity code. In addition, the commodity registration unit 1005 registers the commodity name, the price, and the item number associated with the commodity code in the commodity master 112.

In addition, the commodity registration unit 1005 outputs information for the commodity that has been registered in the commodity registration table 113. For example, the commodity registration unit 1005 causes the first display control unit 1001 and the third display control unit 1003 to display and output a commodity registration screen G1 (see FIG. 7) including information on a commodity that has been registered in the commodity registration table 113.

Here, FIG. 7 is an explanatory diagram illustrating an example of a commodity registration screen G1. The commodity registration screen G1 includes a registered commodity list area G11, a registered commodity area G12, and a total amount area G13. The registered commodity list area G11 is an area for displaying a list of information for commodities registered in the commodity registration table 113. That is, as illustrated in FIG. 7, in the registered commodity list area G11, the commodities registered in the commodity registration table 113 are listed as read by either the first scanner 104 or the second scanner 109 along with other information for the commodity (item number and unit price or the like). The registered commodity area G12 is an area for displaying information for the commodity that was last (most recently) registered by the commodity registration unit 1005. In addition, as illustrated in FIG. 7, in the registered commodity area G12, the last registered commodity is also listed as read by either the first scanner 104 or the second scanner 109. The total amount area G13 is an area for displaying the total sales price of all the commodities that have been registered by the commodity registration unit 1005 in the sales transaction.

The sizes of the first display unit 105 and the third display unit 108 are different from each other. In addition, the first display unit 105 is intended to display toward the clerk. On the other hand, the third display unit 108 is intended to display toward the customer. Therefore, the commodity registration unit 1005 may cause the third display control unit 1003 to display a screen different from the commodity registration screen G1. For example, the commodity registration unit 1005 may omit the registered commodity list area G11 from its display screen and cause the third display control unit 1003 to display a screen illustrating only the registered commodity area G12 and the total amount area G13.

The communication control unit 1006 controls the communication interface 103 to control communication with the POS terminal 20 and the like connected to the network. For example, if the operation unit 107 accepts an input operation to end the commodity registration process, the communication control unit 1006 transmits the commodity registration table 113 to the POS terminal 20. That is, the communication control unit 1006 transmits the commodity registration table 113, which identifies the commodity codes of the commodities registered by the commodity registration unit 1005 as read by either the first scanner 104 or the second scanner 109, to the POS terminal 20.

Based on the scanner code of each commodity in the commodity registration table 113, the POS terminal 20 displays a screen that can identify which of the registered commodity codes were read by the first scanner 104 or the second scanner 109. In addition, based on the scanner code of each commodity in the commodity registration table 113, the POS terminal 20 prints a receipt indicating the details of sales transaction including identifying which commodity codes were read by which of the first scanner 104 or the second scanner 109.

As described above, according to the registration device 10 of the present embodiment, the second reading window 14 is provided on the customer-side side surface of the housing 11 and at substantially the same height as the first reading window 12, or otherwise at a height lower than the first reading window 12. Therefore, a customer of short stature can easily hold an article to the second reading window 14. Therefore, the registration device 10 according to the present embodiment can improve the ease of use by the customer.

In the above example embodiment, it was described that the second reading window 14 and the second scanner 109 are disposed at substantially the same height as the first reading window 12 and the first scanner 104. However, in other examples, the second reading window 14 and the second scanner 109 may be provided at a height less than that at which the first reading window 12 and the first scanner 104 are provided.

Furthermore, the second reading window 14 and the second scanner 109 may be movable along the vertical direction. In such a case, the housing 11 includes, for example, a vertical rail (or rails) to which the mounting plate 13 is attached to be slidable or the like. The rail permits the position of the mounting plate 13 to be adjusted along the vertical direction. The second reading window 14, and the second scanner 109 are attached to the mounting plate 13. Therefore, the second reading window 14 and the second scanner 109 can move in the vertical direction along the vertical rail.

In addition, the registration device 10 of one example includes both a first scanner 104 and a second scanner 109. However, the registration device 10 need not be separately provided with the second scanner 109 in all embodiments. For example, the registration device 10 may include a transmission path inside the housing 11 that transmits light entering via the second reading window 14 to the first scanner 104 using a plurality of mirrors. As a result, the registration device 10 can read an article held over either of the two reading windows without being provided with a fully separate second scanner 109.

The control programs and software programs to be executed the disclosed embodiments and the modifications thereof were assumed to be stored in advance in a storage medium (ROM or storage unit), but these programs are not limited thereto. For example, these programs may be provided on a non-transitory computer readable recording medium such as a CD-ROM, a flexible disk (FD), a CD-R, a digital versatile disk (DVD) in an installable or an executable format. Furthermore, these programs may be, in some embodiments, transmitted by a LAN, the Internet, or the like to be downloaded and executed as necessary.

In addition, these programs may be stored on a computer connected to a network such as the Internet and provided to a registration device or system by being downloaded via the network, or the programs may be provided or distributed via a network such as the Internet.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the inventions.

What is claimed is:

1. A reading device, comprising:
   a housing having a height in a first direction;
   a first reading window on a first surface side of the housing at a first height position along the first direction;
   a first reading unit inside the housing and configured to direct light out the first reading window for imaging an item;
   a second reading window on a second surface side of the housing at a second height position along the first direction that is less than the first height position in height; and
   a second reading unit inside the housing and configured to direct light out the second reading window for imaging an item.

2. The reading device according to claim 1, further comprising:
   a register unit configured to include each item identified by a reading of a commodity code by either of the first reading unit or the second reading unit as a registered item in a sales transaction.

3. The reading device according to claim 2, further comprising:
   an output unit configured to output information for each item registered in the sales transaction indicating which of the first or second reading unit read the commodity code from the registered item.

4. The reading device according to claim 1, further comprising:
   a decoder to decode information read by the first reading unit and information read by the second reading unit.

5. The reading device according to claim 1, wherein the second reading window is mounted to the housing in a manner permitting the second height position to be varied along the first direction.

6. The reading device according to claim 5, wherein the second reading window is mounted to a vertical rail on the housing to permit sliding along the vertical rail.

7. The reading device according to claim 1, wherein the first reading unit comprises a bar code scanner.

8. The reading device according to claim 7, wherein the second reading unit comprises a bar code scanner.

9. The reading device according to claim 1, wherein the second reading unit comprises a bar code scanner.

10. The reading device according to claim 1, further comprising:
a controller configured to receive commodity code information transmitted by one of the first reading unit or the second reading unit and store a commodity code corresponding to the received commodity code information in association with a scanner code indicating which of the first or second reading units transmitted the commodity code information.

11. The reading device according to claim 10, wherein the controller is further configured to output a plurality of stored commodity codes in association with respective scanner codes to a sales registration device for sales transaction settlement processing.

12. A sales register apparatus, comprising:
a housing having a height in a first direction;
an operator display screen mounted on the housing and facing an operator side of the housing;
an operation panel mounted on the housing adjacent to the operator display screen and facing the operator side;
a first reading window on a first surface of the housing facing the operator side of the housing, the first reading window being at a first height position along the first direction;
a first reading unit inside the housing and configured to direct light out the first reading window for imaging an item on the operator side;
a second reading window on a second surface of the housing facing a customer side of the housing, the second reading window being at a second height position along the first direction that is less than the first height position in height; and
a second reading unit inside the housing and configured to direct light out the second reading window for imaging an item on the customer side.

13. The sales register apparatus according to claim 12, wherein the second reading window is mounted to the housing in a manner permitting the second height position to be varied along the first direction.

14. The sales register apparatus according to claim 13, wherein the second reading window is mounted to a vertical rail on the housing to permit sliding along the vertical rail.

15. The sales register apparatus according to claim 12, wherein the first reading unit comprises a bar code scanner.

16. The sales register apparatus according to claim 12, wherein the second reading unit comprises a bar code scanner.

17. The sales register apparatus according to claim 12, further comprising:
a controller configured to receive commodity code information transmitted by one of the first reading unit or the second reading unit and store a commodity code corresponding to the received commodity code information in association with a scanner code indicating which of the first or second reading units transmitted the commodity code information.

18. The sales register apparatus to claim 17, wherein the controller is further configured to output a plurality of stored commodity codes in association with respective scanner codes for display on the operator display screen.

19. The sales register apparatus to claim 12, further comprising:
a customer display screen mounted on the housing and facing the customer side of the housing.

20. A vertical scanner, comprising:
a housing to be mounted to a checkout counter and have a height in a first direction orthogonal to an upper surface of the checkout counter;
an operator display screen mounted on the housing to face an operator side of the checkout counter;
an operation panel mounted on the housing adjacent to the operator display screen and facing the operator side;
a first reading window on a first surface of the housing facing the operator side of the housing, the first reading window being at a first height position along the first direction from the checkout counter;
a first scanner inside the housing and configured to direct light out the first reading window for imaging an item on the operator side;
a second reading window on a second surface of the housing facing a customer side of the checkout counter, the second reading window being at a second height position along the first direction from the checkout counter, the second height position being less than the first height position in height from the checkout counter;
a second scanner inside the housing and configured to direct light out the second reading window for imaging an item on the customer side; and
a controller configured to receive commodity code information transmitted by one of the first scanner or the second scanner and store a commodity code corresponding to the received commodity code information in association with a scanner code indicating which of the first or second scanners transmitted the commodity code information.

* * * * *